US012614227B2

(12) United States Patent
Lim

(10) Patent No.: US 12,614,227 B2
(45) Date of Patent: Apr. 28, 2026

(54) ACCOUNT TRANSFER INTERWORKING SYSTEM

(71) Applicant: Jongjin Lim, Seoul (KR)

(72) Inventor: Jongjin Lim, Seoul (KR)

( * ) Notice: Subject to any disclaimer, the term of this patent is extended or adjusted under 35 U.S.C. 154(b) by 0 days.

(21) Appl. No.: 18/035,684

(22) PCT Filed: Nov. 5, 2020

(86) PCT No.: PCT/KR2020/015410
§ 371 (c)(1),
(2) Date: May 5, 2023

(87) PCT Pub. No.: WO2022/097779
PCT Pub. Date: May 12, 2022

(65) Prior Publication Data
US 2024/0046346 A1     Feb. 8, 2024

(51) Int. Cl.
G06Q 40/02 (2023.01)
H04L 9/40 (2022.01)

(52) U.S. Cl.
CPC ............. G06Q 40/02 (2013.01); H04L 63/08 (2013.01)

(58) Field of Classification Search
CPC ................................ G06Q 40/02; H04L 63/08
See application file for complete search history.

(56) References Cited

U.S. PATENT DOCUMENTS 11,769,132 B1 * 9/2023 Sprague ................. G06Q 20/32
705/37
2003/0225688 A1 * 12/2003 Dobbins ................ G06Q 20/10
705/39

FOREIGN PATENT DOCUMENTS

| CN | 101162518 | A | 4/2008 | | |
|----|-----------|---|--------|---|---|
| CN | 101203878 | A | 6/2008 | | |
| CN | 102930469 | A | 2/2013 | | |
| CN | 107798517 | A | 3/2018 | | |
| JP | 2006085256 | A | 3/2006 | | |
| KR | 20020000911 | A | 1/2002 | | |
| KR | 20110123428 | A | 11/2011 | | |
| KR | 20160131153 | * | 11/2011 | .......... | G06Q 20/108 |
| KR | 20140041205 | A | 4/2014 | | |
| KR | 20150082775 | A | 7/2015 | | |
| KR | 20110123428 | * | 11/2016 | ............ | G06Q 40/02 |
| KR | 20160131153 | A | 11/2016 | | |
| KR | 20210037490 | A | 4/2021 | | |
| KR | 20210038265 | A | 4/2021 | | |
| KR | 20210059881 | A | 5/2021 | | |

* cited by examiner

*Primary Examiner* — Scott S Trotter

(74) *Attorney, Agent, or Firm* — Maschoff Brennan

(57) ABSTRACT

One or more embodiments of the present disclosure may include a system for displaying, on an account transfer screen, image information such as that of counterpart bank, account number, and amount of transfer money on the account transfer screen image during account transfer. In some embodiments, the method may additionally include transmitting a transfer result to a designated server after the transfer. In some embodiments, a remitter may not individually select a counterpart bank, input an account number, and input the amount of money. In some embodiments, an institution may receive an account transfer result in real time or substantially real time, such that the institution may not check for money deposits one by one.

3 Claims, 4 Drawing Sheets

FIG. 3

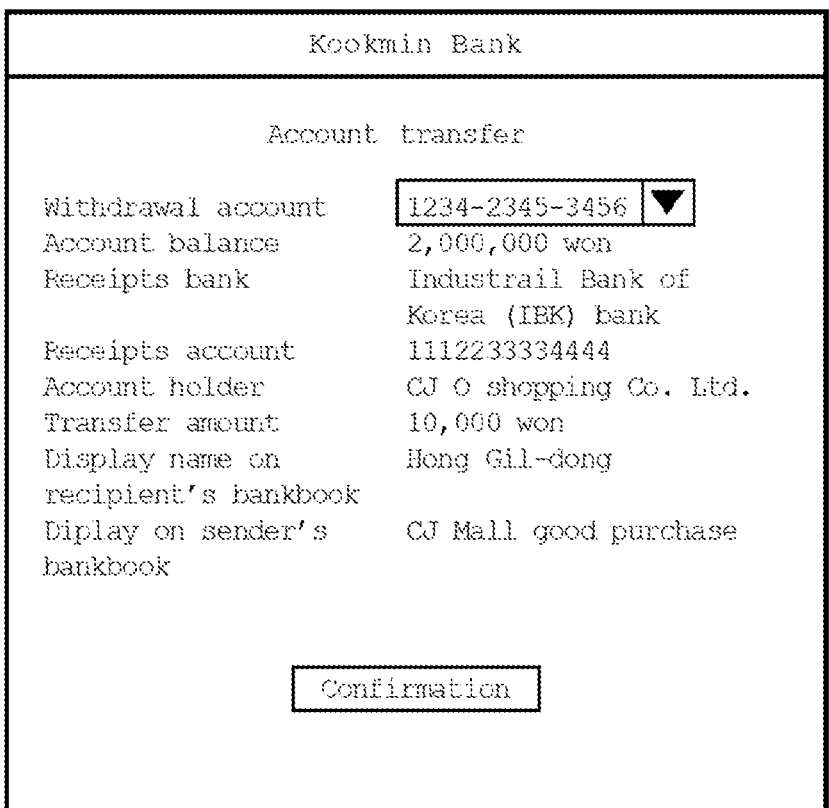

```
┌─────────────────────────────────────────────────┐
│                  Kookmin Bank                   │
├─────────────────────────────────────────────────┤
│                                                 │
│                Account transfer                 │
│                                                 │
│   Withdrawal account    ┌───────────────┬───┐   │
│                         │ 1234-2345-3456│ ▼ │   │
│   Account balance       └───────────────┴───┘   │
│   Receipts bank         2,000,000 won           │
│                         Industrail Bank of      │
│                         Korea (IBK) bank        │
│   Receipts account      1112233334444           │
│   Account holder        CJ O shopping Co. Ltd.  │
│   Transfer amount       10,000 won              │
│   Display name on       Hong Gil-dong           │
│   recipient's bankbook                          │
│   Diplay on sender's    CJ Mall good purchase   │
│   bankbook                                      │
│                                                 │
│                                                 │
│                 ┌───────────────┐               │
│                 │  Confirmation │               │
│                 └───────────────┘               │
│                                                 │
└─────────────────────────────────────────────────┘
```

FIG. 4

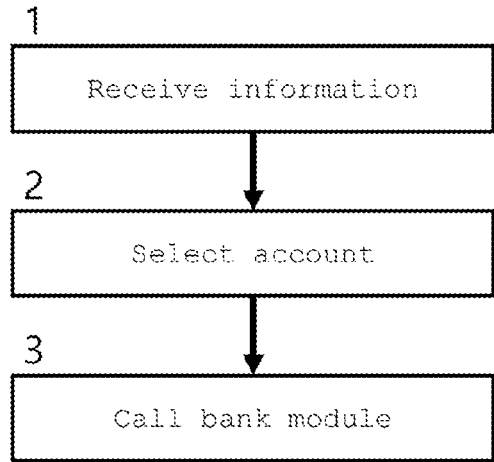

1
┌──────────────────────────────┐
│     Receive information       │
└──────────────────────────────┘
              │
              ▼
2
┌──────────────────────────────┐
│       Select account          │
└──────────────────────────────┘
              │
              ▼
3
┌──────────────────────────────┐
│       Call bank module        │
└──────────────────────────────┘

FIG. 5

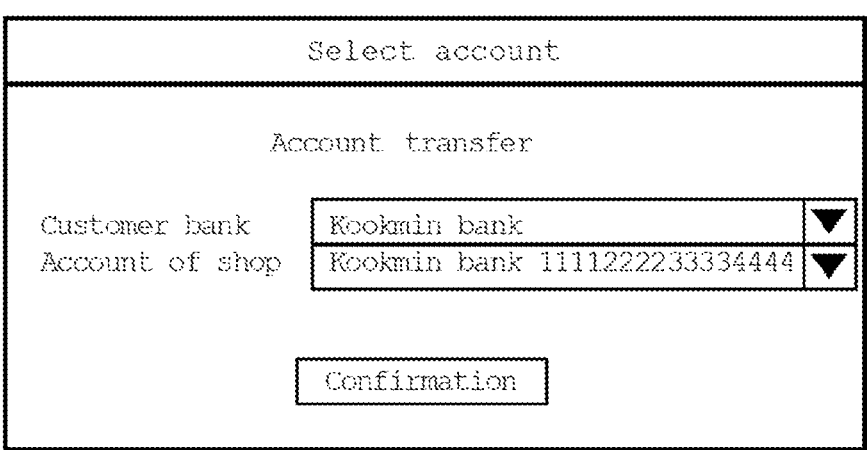

```
┌─────────────────────────────────────────────────────────┐
│                    Select account                        │
├─────────────────────────────────────────────────────────┤
│                                                          │
│                  Account  transfer                       │
│                                                          │
│  Customer bank   ┌─────────────────────────┐ ┌───┐      │
│                  │ Kookmin bank            │ │ ▼ │      │
│  Account of shop ┌─────────────────────────┐ ┌───┐      │
│                  │ Kookmin bank 1111222233334444│ ▼ │  │
│                  └─────────────────────────┘ └───┘      │
│                                                          │
│              ┌─────────────────┐                        │
│              │  Confirmation   │                        │
│              └─────────────────┘                        │
│                                                          │
└─────────────────────────────────────────────────────────┘
```

FIG. 6

Bank
module

3. Call bank module and
   deliver information

5. Deliver transfer          4. Account
   result                       transfer Shopping                                    Interworking
mall                                        module 1. Deliver account
   list and order
   information 2. Select bank
   and account

FIG. 7

ACCOUNT TRANSFER INTERWORKING SYSTEM

FIELD OF INVENTION

The present application is related to and claims priority to the following co-pending application, the entirety of which is incorporated by reference herein: KR10-2019-0120185, entitled "Account transfer interworking system," filed on Sep. 27, 2019.

BACKGROUND OF INVENTION

Recently, the number of cases of account transfers over the Internet has increased in place of directly visiting to a bank and, specifically, mobile account transfers according to the spread of smartphones are being increased.

SUMMARY OF INVENTION

Technical Problem to be Solved

However, at present, in order to make a bank transfer, it is required to access a bank homepage (or website) or run a bank application, log in, select a counterpart bank, enter an account number and input an amount for transfer.

In order to record a transfer reason, a sender's (or remitter's) statement subject ("statement") must also be inputted. Further, if a name other than the sender's name is to be printed on a recipient's (remittee's) bankbook, the recipient's statement should also be inputted.

Therefore, it is very inconvenient since many pieces of information must be inputted one by one in order to perform account transfer.

Technical Solution

The present invention relates to a system for displaying, on an account transfer screen, information transmitted from the outside, without the need for a user to input, one by one, pieces of information such as a counterpart bank, account number, and transfer amount on the account transfer screen during account transfer, and then transmitting a transfer result to a specified server after the transfer.

Effect of Invention

According to the present invention, a sender does not have to directly select a counterpart bank, enter an account number, and input a transfer amount, thereby enhancing convenience.

In addition, an institution receiving an account transfer may receive an account transfer result in real time, so that there is no need to check whether or not the money has been deposited.

BRIEF DESCRIPTION OF DRAWINGS

FIG. 3 illustrates a bank account transfer screen according to the present invention.

FIG. 4 illustrates flowchart of an interworking module according to the present invention.

FIG. 5 illustrates a screen of the interworking module according to the present invention.

FIG. 6 illustrates a flowchart when the present invention is applied to a shopping mall.

Figure 7:
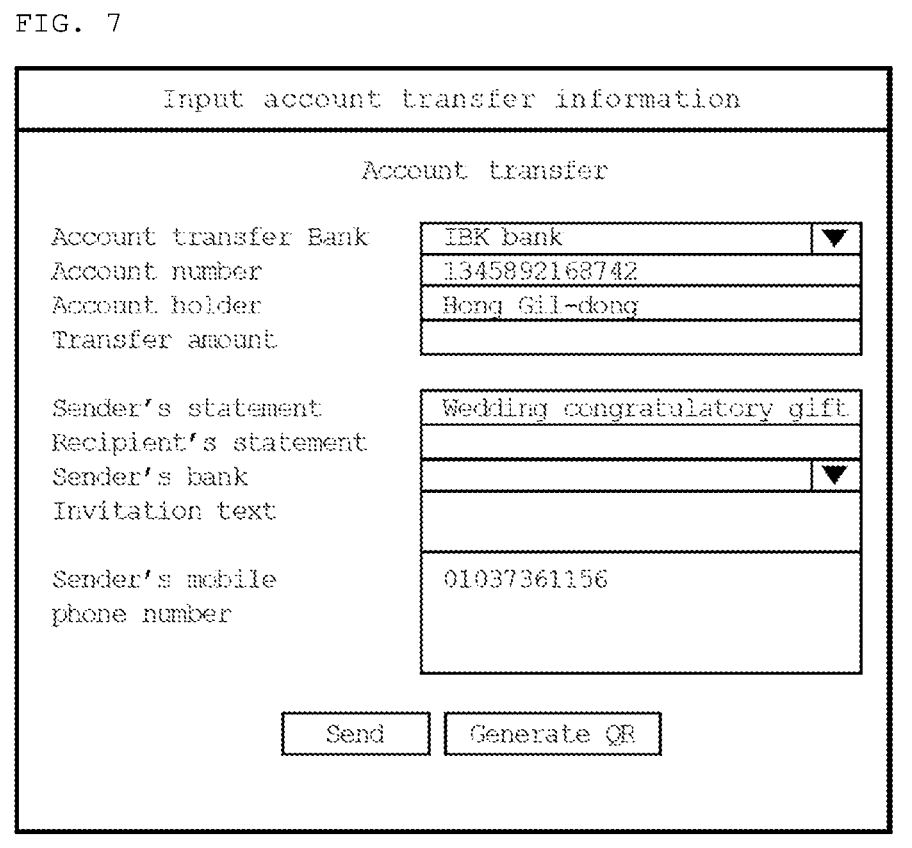

FIG. 7 illustrates an account transfer information input screen according to the present invention.

BEST MODE OF INVENTION

Figure 1:
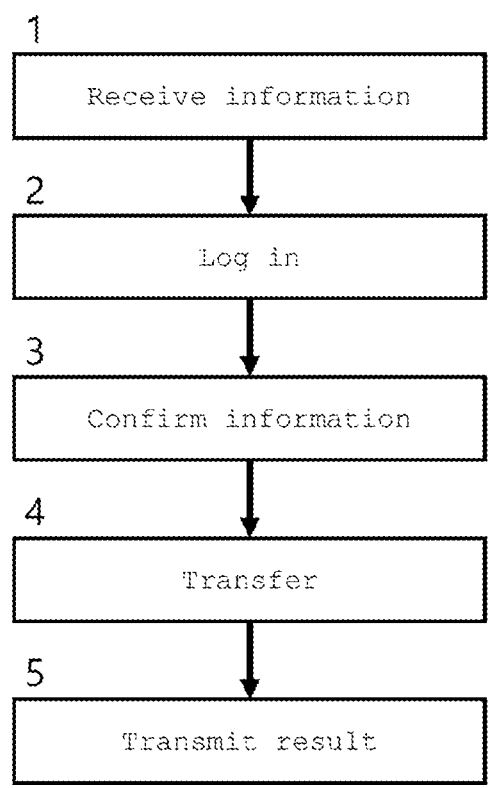
FIG. 1 illustrates is an exemplary flowchart of a transfer module according to the present invention.

The bank module may be made to operate as follows.

Step 1, the bank module receives the following information.

If the sender uses Kookmin Bank, the bank transfer module is called as follows.

Of course, even in the same bank, the URL subjected to calling may vary depending on whether the sender is an individual or a corporation or uses the escrow function.

http://www.kbstar.com/
transfer.asp?bankcd=003&account=1112233334444&
amount=10000&sendmsg=CJ Mall products
purchase&recvmsg=Hong Gil-
dong&ordno=20180815000001&returl=http://www.cjmall-
.com/return.asp In this regard, "bankcd" refers to a recipient bank code.

That is, in this example, it means remittance from Kookmin Bank to the IBK account.

"account" refers to a recipient's bank account number.

"amount" refers to an amount to be transferred.

If the amount has not been determined in advance, it may be omitted.

"sendmsg" refers to a sender's statement, which is displayed in the sender's bankbook.

In this example, it means the purchase price for products at CJ Mall.

"recvmsg" refers to a recipient's statement, which is displayed in the recipient's bankbook.

As with the existing account transfers, if recvmsg is omitted, the bank enters the name of an account holder of the sender's account.

In some cases, "sendmsg" and "recvmsg" may be omitted.

"ordno" refers to an identification number by which the server receiving the return result can identify the transfer case when a transfer result is returned.

"returl" refers to the URL where the result is returned after the transfer.

Depending on the use method, "returl" and "ordno" may be omitted.

Further, by transmitting the identification number to recvmsg and storing the identification number in the recipient's statement, the recipient may identify the transfer case as the recipient's statement from the bankbook deposit and withdrawal details.

However, since the number of characters that can be entered in the recipient's statement is generally short, in some cases, it is necessary to increase the size of the field to store the identification number.

Here, for convenience of explanation, GET mode has been described as an example, but of course, POST mode may also be used for transmission.

Step 2, the bank module shows the login screen, and the sender logs in as before.

Step 3, the bank module shows information on the screen as shown in FIG. 3.

Step 3-1, the sender's account information is inquired.

If the sender has multiple internet banking accounts in one bank, multiple accounts are shown and the sender can select.

By showing the balance of each account together, the user can check in advance whether a transfer is possible.

Alternatively, when the transfer amount is received in the above, the balance of each account may be compared with the transfer amount, and transfer possibility may be displayed separately.

Step 3-2, like the existing account transfer, the bank module inquires the recipient's account information and displays the name of the account holder on the screen so that the sender can check it.

Step 3-3, among the received items, an item for which a value is not delivered is displayed as blank and can be entered.

An item to which a value is delivered can be made unmodifiable.

Further, whether it is a general account transfer or an escrow transfer can be displayed on the screen.

Step 4, the sender checks the information on the screen and, as before, performs self-verification using a public certificate, password, fingerprint or OTP, followed by account transfer.

Step 5, when the returl value is delivered, the bank module transmits the transfer result to the corresponding URL.

http://www.cjmall.com/ return.asp?retcd=0K&retmsg=normal&ordno=2018081500 0001&apprno=67351678&bankcd=003&account=1112233 334444&amount=10000&sendmsg=CJ Mall product purchase&recvmsg=Hong Gil-dong In this example, "retcd" indicates a transfer result code and "retmsg" indicates a transfer result string.

"apprno" refers to a transfer number that can identify the transfer.

Of course, when the transfer fails, the failure code and reason are transmitted.

DETAILED DESCRIPTION OF PREFERRED EMBODIMENTS OF INVENTION

Currently, in order to make an account transfer, it is required to access a bank site or run a bank application, log in, select a counterpart bank, enter an account number, and then input an amount to be transferred.

In order to record a reason for the transfer, the sender's information must also be entered. Further, in order to appear a different name of the account holder to the other party, the recipient's information must also be entered.

Therefore, it is very inconvenient since many pieces of information have to be input one by one.

The present invention relates to a system in which a user transfers with transmitted information instead of directly inputting information one by one.

Before description, terms are defined as follows.

A recipient means any company or individual that accepts an account transfer.

A sender means any company or individual that executes an account transfer.

A transfer number refers to a unique number that can be used to identify an account transfer case in a bank, such as a credit card authorization number.

A transfer module is a module provided by the bank and provides a function of account transfer, and in the present invention, it provides a function of transferring money along with the received information and then transmitting a transfer result after the transfer.

The transfer module may be in the form of a web or an application (that is, "app").

An interworking module is a module that calls the transfer module and transmits information, and refers to a module operating in a PC or smartphone.

In general, since each sender has a different bank and each bank has a different calling method, the interworking module allows the sender to select his/her own bank and includes a function of calling an interworking module of the selected bank.

The interworking module may be a separate independent module, or may be each receiver server or integrated server, or a part of the integrated module.

An integrated service means a service to be provided to a plurality of recipients.

The integrated server refers to a server that stores and provides information required for the integrated service.

The description below assumes that the URL of the integrated server is www.bankpays.com.

The integrated module refers to a module operating in a PC or smartphone for an integrated service.

The integrated module may also be in the form of a web or an app.

The identification number is a number for the recipient to identify the account transfer, and may include an order number of a shopping mall or store, a Giro number of a public institution, or a number generated by an integrated service.

Of course, identification numbers and transfer numbers may include characters in addition to numbers.

Further, since online shopping malls are non-face-to-face transactions, and most goods are delivered by courier, it is necessary to deposit the money into the recipient's account after checking whether the delivery is complete.

In this case, account transfer may be executed using the bank's escrow function.

Figure 2:
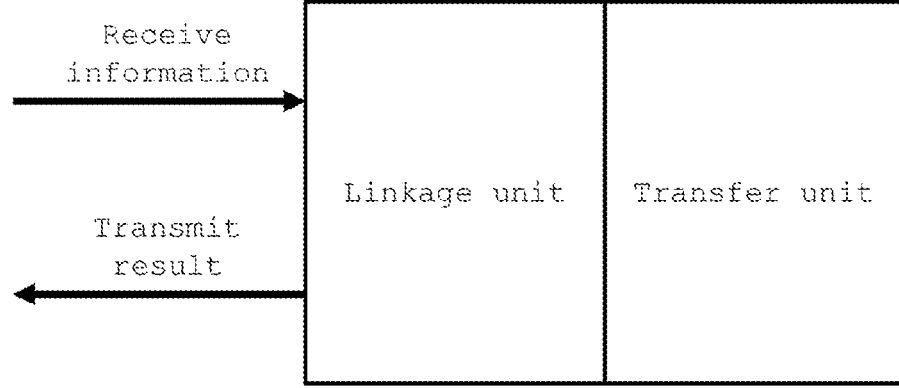
FIG. 2 illustrates a configuration diagram of a transfer module according to the present invention.

The transfer module may comprise a linkage unit and a transfer unit as shown in FIG. 2.

The transfer unit is in charge of the account transfer function as before.

The linkage unit is responsible for receiving the information transmitted from an interworking module and transmitting the transfer result to the designated URL The transfer module is configured to operate as follows.

Step 1, the transfer module receives the following information.

If the sender uses Kookmin Bank, the bank transfer module is called as follows.

Of course, even in the same bank, the URL subjected to calling may vary depending on whether the sender is an individual or a corporation, or uses the escrow function.

http://www.kbstar.com/ transfer.asp?bankcd=003&account=1112233334444& amount=10000&sendmsg=CJ Mall products purchase&recvmsg=Hong Gil- dong&ordno=20180815000001&returl=http://www.cjmall- .com/return.asp Herein, "bankcd" is the recipient bank code.

That is, in this example, it means remittance from Kookmin Bank to the IBK bank account.

"account" is the recipient's bank account number.

"amount" is the amount to be transferred.

If the amount has not been determined in advance, it may be omitted.

"sendmsg" is the sender's statement, which is displayed in the sender's bankbook.

In this example, it means the purchase price for products at CJ Mall.

"recvmsg" is the recipient's statement, which will be displayed in the recipient's bankbook.

Like the existing account transfer, if recvmsg is omitted, the bank enters the name of the account holder of the sender's account.

In some cases, sendmsg and recvmsg may be omitted.

"ordno" is an identification number by which the server receiving the return result can identify the transfer case when a transfer result is returned.

"returl" is the URL where the result is returned after the transfer.

Depending on the use method, returl and ordno may be omitted.

Further, by transmitting the identification number to recvmsg and storing the identification number in the recipient's statement, the recipient may identify the account transfer from the recipient's statement in the bankbook deposit and withdrawal details.

However, since the number of characters that can be entered in the recipient's statement is generally short, in some cases, it is necessary to increase a size of the field in order to store the identification number.

Herein, for convenience of explanation, GET mode has been described as an example, but of course, POST mode may also be used for transmission.

Step 2, the transfer module shows the login screen, and the sender logs in as before.

Step 3, the transfer module shows information on the screen as shown in FIG. 3.

Step 3-1, the sender's account information is inquired.

If the sender has multiple internet banking accounts in one bank, multiple accounts are shown and the sender can select one among them.

By showing the balance of each account together, the user can check in advance whether a transfer is possible.

Alternatively, when the transfer amount is received in the above, the balance of each account may be compared with the transfer amount, and transfer possibility may be displayed separately.

Step 3-2, like the existing account transfer, the transfer module inquires the recipient's account information and displays the name of the account holder on the screen so that the sender can check it.

Step 3-3, among the received items, an item for which a value is not delivered is displayed as blank and can be entered.

An item to which a value is delivered can be made unmodifiable.

Further, whether it is a general account transfer or an escrow transfer can be displayed on the screen.

Step 4, the sender checks the information on the screen and, as before, performs self-verification using a public certificate, password, fingerprint or OTP, followed by account transfer.

Step 5, when the returl value is delivered, the transfer module transmits the transfer result to the corresponding URL.

http://www.cjmall.com/return.asp?retcd=0K&retmsg= normal&ordno=20180815000001&apprno=67351678& bankcd=003&account=1112233334444&amount=10000& sendmsg=CJ Mall product purchase & recvmsg=Hong Gil-dong In this example, "retcd" indicates a transfer result code and "retmsg" indicates a transfer result string.

"apprno" refers to a transfer number that can identify the transfer.

Of course, when the transfer fails, the failure code and reason are transmitted.

In the case of a smartphone app, the app is automatically launched and information is transmitted to the app.

For the above operation, there may be several ways, and it can be simply called in the URL Scheme mode as follows.

bktp://www.kbstar.com/transfer.asp?bankcd=003& account=1112233334444&amount=10000&sendmsg=CJ Mall product purchase & recvmsg=Hong Gil-dong&returl=http://www.cjmall.com/return.asp or bktp-kbstar://www.kbstar.com/transfer.asp?bankcd= 003&account=1112233334444&amount=10000&sendmsg= CJ Mall product purchase recvmsg=Hong Gil-dong&returl=http://www.cjmall.com/return.asp Furthermore, in the case of the smartphone payment module, when an account transfer is successful, the bank code and transfer number are displayed on the screen as numbers and QR codes or barcodes so that users or store employees can visually check or scan with a scanner.

The interworking module interworks with the transfer module as follows.

Step 1, the interworking module receives transfer request information.

It receives information such as the recipient's bank account, transfer amount, sender's statement, recipient's statement, order number, and result receiving URL.

If the sender's bank can be specified, the sender's bank code is also received.

Step 2, the interworking module shows a screen for selecting the sender's bank and the receiver's account as shown in FIG. 5, and allows the sender to select one among them.

Step 2-1, since each sender has a different bank and each bank has a different URL, the screen on which the sender's bank is selected may be displayed, and the sender selects his or her own bank therefrom.

Of course, if the sender's account is specified, this step may be omitted.

Further, if the sender's bank can be stored such as a smartphone app, the previously selected bank can be automatically selected.

Step 2-2, if the recipient has multiple bank accounts, the recipient's account list is displayed and the sender can select the corresponding bank.

To reduce a transfer fee, if there is a bank matching with the sender's bank among the recipient's banks, it can be selected.

Of course, if the recipient has only one account, this step is omitted.

Step 3, the interworking module creates a URL and calls the transfer module.

Step 3-1, the URL is selected as follows according to the sender's bank.

Select Case (Sender Bank Code)
  Case "004": URL=http://www.kbstar.com/transfer.asp
  Case "088": URL=http://www.shinhan.com/transfer.asp
  Case "081": URL=http://www.kebhana.com/transfer.asp
  . . .
End Select Step 3-2, with information such as recipient's bank code, recipient's bank account number, amount to be transferred, sender's statement, recipient's statement, order number, result receiving URL, etc., the URL as in the example above is configured.

Step 3-3, by calling the configured URL, the transfer module is called and information is transmitted.

The present invention may be applied to various fields in different ways.

It may be processed by each recipient or receiving organization, or an integrated service may be used.

In the case of the integrated service, the receiver first joins the integrated service as a member and registers his or her account information.

If the receiver has multiple accounts, multiple accounts may be registered and the sender can select one among the same.

Of course, it is possible to deliver account information every time of account transfer without registering in advance.

As in the above example, it can be used as a payment method when purchasing a product in an Internet shopping mall.

In this case, the receiver is a shopping mall, and the sender may be a customer who purchases a product.

Step 1, the shopping mall server calls the interworking module and delivers information.

Step 2, the shopping mall interworking module shows a bank selection screen as shown in FIG. 5, and the customer selects his/her bank and an account of the shopping mall.

Step 3, the shopping mall interworking module generates a URL as in the above example, calls the transfer module, and delivers information.

Step 4, the user checks the contents of the screen after logging in in the transfer module, and then transfers the money.

Step 5, the transfer module transmits the transfer result to the shopping mall server.

If the bank supports the above function only in the smartphone app, a PC cannot directly call the smartphone's transfer module, and thus it can be processed as follows.

Step 1, the shopping mall server generates a QR code including an order number as follows.

http://www.cjmall.com/transfer-.asp?ordno=2019081500005

Step 2, when a customer scans the QR code on the PC screen with a smartphone, it automatically connects to the shopping mall server.

Step 3, the shopping mall server retrieves an order from the order number and calls the interworking module.

Thereafter, the transfer is executed through the same process as in the above example, and the transfer module transmits the transfer result to the shopping mall server.

Of course, it is also possible to select a customer bank and a shopping mall account in the PC interworking module, and to generate a QR code in the URL with inclusion of the customer bank and shopping mall account information.

This may also be applied to offline stores.

In this regard, a case of using the integrated service will be described as an example.

First, each store registers its own account information after signing up for the integrated service as a member.

If the store has multiple accounts, the multiple accounts may be registered.

After entering the order in the POS, if the customer selects account transfer, it is processed as follows.

Step 1, POS transmits information such as the store's integrated service ID, order number, payment amount, sender statement, and recipient statement, etc. to the integrated module.

http://www.bankpays.com/pay.asp?id=starbucks&ordno=20180815000001&amount=10000&sendmsg=Starbucks Coffee&recvmsg=20180815000001

In the case of transmitting the URL to the customer's smartphone below, the store employee asks for the customer's mobile phone number and enters the same, while the POS transmits the customer's mobile phone number together.

Step 2, the integrated module transmits the received information to the integrated server, and receives an identification number.

Step 2-1, the integrated module transmits the received information to the integrated server.

Step 2-2, the integrated server stores the received information.

Step 2-3, an identification number that can identify the order is generated and returned.

Step 3, the integrated module delivers the URL including the identification number as follows.

http://www.bankpays.com/?id=2018081500063463

Since POS cannot directly deliver the URL to the transfer module of the customer's smartphone, it is processed as follows.

First, if there is a customer monitor in the POS, the identification number is converted into a QR code and displayed on the monitor.

Of course, when scanning with a dedicated app, only the identification number can be included while excluding the URL.

Second, if the POS does not include a customer monitor, the URL can be transmitted to the customer's smartphone by text message or messenger.

Step 4, the customer scans the QR code or touches the URL in the message.

Step 5, the smartphone's integrated module transmits the identification number to the integrated server and receives information necessary for payment.

Step 5-1, the smartphone's integrated module transmits the identification number to the integrated server.

Step 5-2, the integrated server searches for stores by the identification number, and returns the store's account information.

Step 6, the interworking module of the integrated module shows the customer bank and store account selection screen and, when the customer selects, the interworking module creates a URL with the selected information and information received from the POS and then calls the transfer module.

Step 7, the customer transfers money using the transfer module function as in the example described above.

Step 8, when the transfer module transmits the transfer result to the integrated server, the integrated server retrieves the order using the identification number and stores the transfer result.

Step 9, after the customer transfers, the store employee clicks a confirmation button in the POS, and the POS receives the transfer result as follows.

Step 9-1, POS transmits the order number to the integrated module.

Step 9-2, the integrated module transmits the store ID and order number to the integrated server.

Step 9-3, the integrated server retrieves and returns the transfer result with the store ID and order number.

Without using the integrated service in the POS not including a server that receives the results, it is possible to directly create a URL and display the same as a QR code or transmit the URL. Further, it is possible to check whether the transfer has been made through the customer's smartphone screen as described above.

With regard to various utility bills, a paper bill such as GIRO paper is generally issued, and the user visits a bank to pay or use internet banking to transfer money to the bank.

According to the present invention, a URL including information for identifying the relevant case is transmitted to the user by text, messenger, or e-mail as follows.

http://www.kepco.co.kr/pay.asp?no=1065726984

After that, the user can click the URL and pay the fee directly as follows.

Step 1, when the user clicks the URL after receiving a text message, messenger or mail, the website is accessed.

Step 2, the server of the relevant institution retrieves the identification number and checks whether the payment has already been made.

If the payment has not been made, it proceeds to the next step.

Step 3, the interworking module of the institution shows the customer bank and the institution's bank selection screen, and the user selects one among them.

Step 4, the interworking module of the relevant institution creates a URL as follows, calls the transfer module, and delivers information.

http://www.kbstar.com/
transfer.asp?bankcd=003&account=
1112233334444&amount=10000&sendmsg=Electricity fee (Aug) & recvmsg=Hong Gil-dong&ordno=20180815000001&returl=http://www.kepco-.com/return.asp Step 5, thereafter, account transfer is executed through the same process as in the above example.

Step 6, the bank transmits the payment result to the corresponding institution server as in the example above.

It can also be applied to account transfers between individuals and companies.

Herein, a process of delivering congratulatory money or condolence money will be described using the integrated service as an example.

In the description below, the recipient is a wedding party, contracting parties in marriage and/or a chief mourner, while the sender may be a guest or mourner.

As in the example above, the recipient subscribes to the integrated service as a member and registers his/her bank and account number.

Step 1, the recipient logs into the server.

Step 2, the server displays a screen as shown in FIG. 2, and the recipient inputs information.

It shows the account of the recipient registered in the member information.

When registering multiple accounts, any one of the accounts may be selected.

If not selecting an account, it is possible for the sender to choose one when transferring.

Since the bank of a person making the transfer is not known, it is not entered.

The recipient statement is also not inputted so that the sender's account holder name is automatically displayed.

Of course, if sending along with designating a specific person, it is inputted.

Furthermore, since an amount to be transferred is not fixed, it is left blank.

Since no results are transmitted, "ordno" or "returl" is not entered.

Of course, the integrated server can automatically designate returl as itself and, when the account transfer is complete, notify the sender or receiver by text message Step 3, when the recipient clicks "Send" or "Generate QR", the following URL is created.

http://
bankpays.com?bankcd=003&account=1112233334444&
amount=&sendmsg=Hong Gil-dong wedding gift&recvmsg=

Of course, only a shortened URL or identification number may be included.

If clicking Send, a URL is created and transmitted to the entered mobile phone number by text message or messenger.

If the content to be transmitted is different for each transfer, a function of uploading to Excel may be provided.

By copying the generated URL, the recipient may transmit the same by text message, messenger or e-mail along with the invitation text.

When clicking the Generate QR button, the URL is created as a QR code image, and the recipient may print the QR code image and attach it to the ceremonial hall.

Of course, it is possible not to sign up as a member, and it is possible to enter an account number every time when using the service without registering an account number.

After receiving a text, message, or e-mail, the sender clicks the URL or scans the QR code at the site to operate as follows.

Step 1, the sender clicks the URL or scans the QR code to connect to the integrated server.

Step 2, the integrated server transmits the received content to the interworking module.

Step 3, the interworking module of the integrated service shows the sender's bank selection screen, and when the sender selects their bank, the interworking module creates a URL with the selected information and the received information and calls the transfer module.

Step 4, thereafter, account transfer is executed through the same process.

However, since the amount was called with a blank space, enter it directly and transfer it.

In the case of scanning the QR code in the description above, the QR code scanning function may be added to the bank app and linked with the transfer module as follows.

As in the example above, it is assumed that the QR code contains the following information.

http://www.cjmall.com/transfer.asp?ordno=
201908150000

Step 1, the sender runs their bank app and scans the QR code.

Step 2, the bank app receives the necessary information for the transfer from the server.

Step 2-1, the bank app transmits the bank identification information along with the identification number to the server as follows.

http://www.cjmall.com/
transfer.asp?ordno=20190815000005&bankcd=004

Step 2-2, the corresponding server returns the recipient bank code, recipient bank account number, transfer amount, sender statement, recipient statement, order number, and result receiving URL information.

At this time, if the server has the same bank account as the received bank identification information, the account information may return only the corresponding account.

Step 3, the bank app calls the transfer module and executes account transfer using the transfer module.

Of course, since the payment module is called internally, it may be delivered as a parameter directly instead of the URL or URL Scheme mode. Further, if logging in when the bank app is executed in the first step described above, the log-in step in the transfer module may be omitted.

In addition to the above, this process can be applied to various fields.

According to the present invention, it is not necessary that a person who is intended to transfer money individually selects a counterpart bank, enters an account number and inputs a transfer amount, thereby improving convenience while reducing erroneous transfer cases.

Further, as like the existing account transfer, it is possible to not only perform self-verification with a password, public certificate, fingerprint, OTP, etc., but also check the name of the other party's account holder, thereby ensuring safety.

Moreover, as compared to the payment means such as credit card and real-time account transfer that use VAN or PG, the present invention adopts a method of transferring money directly to the corresponding account so that a transfer fee is low, a separate settlement process is not required, and the money rotation of the shopping mall becomes smooth.

Therefore, each organization may save money because there is no need to send bills or GIRO papers.

Further, banks may not only provide services by modifying the existing account transfer function slightly, but also simplify development and maintenance because it can be applied to various fields with one module. In addition, if such account transfer is simplified, it may be activated to thus increase a profit of transfer fees.

Further, there is no need to issue a virtual account because the recipient can identify the account transfer case by the identification number.

In addition, the above description is only one embodiment of the present invention, and various modulations and modifications are possible within the scope of the present invention.

INDUSTRIAL APPLICABILITY

According to the present invention, it is not necessary that a person who is intended to transfer money individually selects a counterpart bank, enters an account number and inputs a transfer amount, thereby greatly improving convenience.

On the other hand, an institution that receive account transfers may receive the transfer results in real time, and therefore, there is no need to check whether or not the money has been deposited.

Therefore, account transfer may be activated because it is conveniently used as a payment mean for shopping malls or stores or as a payment mean for various utility bills.

The invention claimed is:

1. An account transfer interworking system, comprising: a bank transfer module and an interworking module,
   wherein the bank transfer module includes:
   a transfer unit configured to search for account information of a recipient using a recipient bank and a recipient account number, authenticate a user using OTP (one time password) or certificate, and execute an account transfer; and
   a linkage unit configured to receive information required for the account transfer from the interworking module and transmit the information to the transfer unit, and transmit the transfer result transmitted from the transfer unit to the interworking module,
   wherein the interworking module is configured to transmit information required for the account transfer to the bank transfer module and receive a transfer result from the bank transfer module, the information including the recipient bank, the recipient account number and a transfer amount, and
   wherein the bank transfer module is configured for displaying the information transmitted from the interworking module on an account transfer screen of the bank transfer module without a need for the user to input, one by one, pieces of information required for account transfer on the account transfer screen; and for transmitting the transfer result to the interworking module after executing the account transfer according to the information displayed on the account transfer screen.

2. The account transfer interworking system according to claim 1, wherein the bank transfer module is configured for:
   receiving the transmitted information,
   allowing the user to log into the bank transfer module,
   displaying user account information, and the transmitted information on the account transfer screen,
   authenticating the user and executing the account transfer, and
   transmitting the transfer result to the interworking module.

3. The system according to claim 1, wherein the interworking module is configured for selecting a bank of the user.

* * * * *